US012662072B2

(12) United States Patent
Schall

(10) Patent No.: US 12,662,072 B2
(45) Date of Patent: Jun. 23, 2026

(54) WORK MACHINE WITH ELECTRIC TRACTION DRIVE

(71) Applicant: Liebherr-Werk Nenzing GmbH, Nenzing (AT)

(72) Inventor: Paul Schall, Feldkirch (AT)

(73) Assignee: LIEBHERR-WERK NENZING GMBH, Nenzing (AT)

( * ) Notice: Subject to any disclaimer, the term of this patent is extended or adjusted under 35 U.S.C. 154(b) by 393 days.

(21) Appl. No.: 18/466,537

(22) Filed: Sep. 13, 2023

(65) Prior Publication Data

US 2024/0092290 A1 Mar. 21, 2024

(30) Foreign Application Priority Data

Sep. 21, 2022 (DE) ..................... 20 2022 105 314.6

(51) Int. Cl.
*B60R 16/03* (2006.01)
*B62D 55/08* (2006.01)

(52) U.S. Cl.
CPC .............. *B60R 16/03* (2013.01); *B62D 55/08* (2013.01)

(58) Field of Classification Search
CPC . B60R 16/03; B60R 55/08; B60K 2007/0038; B60K 7/0007; E02F 3/58
See application file for complete search history.

(56) References Cited

U.S. PATENT DOCUMENTS

| | | | | |
|---|---|---|---|---|
| 2,132,184 | A * | 10/1938 | Poche | ........................ E02F 9/04 180/8.5 |
| 9,362,797 | B2 | 6/2016 | Murata et al. | |
| 9,828,049 | B2 | 11/2017 | Lyle et al. | |
| 10,274,532 | B1 * | 4/2019 | Smith | ..................... B60R 16/03 |
| 12,479,303 | B2 * | 11/2025 | Olsmo | ................. B60L 3/0092 |
| 2010/0291418 | A1 * | 11/2010 | Zhou | ................... H01M 50/204 429/96 |
| 2014/0062493 | A1 * | 3/2014 | Farrell | .................... B60L 50/60 324/426 |
| 2014/0360811 | A1 | 12/2014 | Ross, Jr. et al. | |
| 2022/0024318 | A1 * | 1/2022 | Baumann | ................ B60L 53/20 |
| 2022/0074163 | A1 | 3/2022 | Terashima et al. | |

FOREIGN PATENT DOCUMENTS

| | | |
|---|---|---|
| CN | 109693544 A | 4/2019 |
| DE | 102008028785 A1 | 12/2009 |
| DE | 102011118954 A1 | 5/2013 |
| JP | H09144060 A | 6/1997 |
| JP | 2021156049 A | 10/2021 |

* cited by examiner

*Primary Examiner* — George C Jin
(74) *Attorney, Agent, or Firm* — McCoy Russell LLP

(57) ABSTRACT

The disclosure relates to a work machine, in particular a duty-cycle crawler crane, having an undercarriage which comprises a middle part and at least one crawler carrier which is connected to the middle part and comprises at least one electric traction drive, wherein at least one supply line runs from the middle part to the traction drive and is connected to the latter in a disconnectable manner via a first connection. According to the disclosure, the work machine comprises an electrical interlock loop, which is connected to the traction drive via the first connection, and a mating plug connector module, which is arranged on the undercarriage and has a first mating connection for connecting to the first connection of the supply line and is configured to bridge the interlock loop, which is interrupted by a disconnection from the traction drive, in a current-conducting manner.

17 Claims, 6 Drawing Sheets

WORK MACHINE WITH ELECTRIC TRACTION DRIVE

CROSS REFERENCE TO RELATED APPLICATION

The present application claims priority to German Patent Application No. 20 2022 105 314.6 filed on Sep. 21, 2022. The entire contents of the above-listed application are hereby incorporated by reference for all purposes.

TECHNICAL FIELD

The present disclosure relates to a work machine, in particular a duty-cycle crawler crane.

BACKGROUND

In electrically driven work machines with crawler tracks, electric traction drives or traction motors in the form of electric motors are typically arranged on the crawler carriers which drive the crawler chains. Such work machines often have an undercarriage with a middle part on which the crawler carriers are mounted, wherein a superstructure can be rotatably mounted on the middle part.

SUMMARY

The electric traction drives are usually supplied with power and, if necessary, coolant from the undercarriage. The traction drives are typically connected to the work machine's high-voltage (HV) on-board power supply system, and power electronics located on or in the undercarriage can handle communication with the traction drives and modulation of current and voltage to power the traction drives. Power supply to the traction drives occurs via energy supply lines, typically AC three-phase power cables connected to inverters on the power electronics. In addition, there are often a number of other supply lines such as coolant lines, control lines for controlling the traction drives and/or signal lines for transmitting sensor signals, for example.

In some known work machines, the crawler carriers are detached from the middle part for transport. In some cases, such work machines can themselves lift the crawler carriers, which are transported to the construction site on a separate low-loader truck, for example, to the undercarriage in a self-assembly mode in the partially scaffolded state. If such work machines are to be driven electrically, i.e. the crawler carriers are to be equipped with corresponding electric traction drives, it must be possible to disconnect the supply lines of the traction motors from the traction drives for dismantling the crawler carriers. However, this results in the potentially dangerous condition of having open connections of supply lines that are still connected to the HV on-board power supply system and are therefore under high voltage.

Against this background, the object underlying the present disclosure is to increase safety during the mounting and demounting of the crawler carriers on generic electrified work machines and, at the same time, make the attachment and detachment of the crawler carriers simple.

According to the disclosure, this object is achieved by a work machine having the features as described herein.

According thereto, a work machine is proposed which comprises an undercarriage with a middle part and at least one crawler carrier connected to the middle part. The work machine may, for example, be a duty-cycle crawler crane.

The at least one crawler carrier has at least one electric traction drive, which in particular drives a crawler chain of the crawler carrier. The traction drive is in particular an electric motor. The traction drive is supplied via at least one supply line from the middle part of the work machine, in particular with high voltage or current from a HV on-board power supply system of the work machine. The supply line is connected to the traction drive via a connection and can therefore be disconnected from the traction drive, for example for demounting of the crawler carrier.

In order to eliminate the potential safety risk posed by the end of the supply line that is open after it has been disconnected (for example, for personnel during assembly/disassembly of the crawler carrier), according to the disclosure the work machine is provided with an electrical interlock loop that is connected to the traction drive via the first connection. In other words, the traction drive is included in the interlock loop via the first connection. If the first connection of the supply line is disconnected, the interlock loop is thus interrupted.

According to the disclosure, the work machine further comprises a mating plug connector module arranged on the undercarriage and having a first mating connection for connecting to the first connection of the supply line previously disconnected from the traction drive (or a connection on the traction drive side). The mating plug connector module is configured to bridge the interlock loop interrupted by a disconnection from the traction drive by connecting the first connection to the first mating connection in a current-conducting manner, i.e. to close the interlock loop.

In particular, the interlock loop represents a separate, closed electrical circuit whose interlock line runs through the first connection or a connector comprising the first connection to the traction drive and back again. An interruption of the closed interlock loop results in a change of a read-out parameter of the interlock loop, whereby the interruption can be detected and, if necessary, an appropriate measure can be taken.

If the supply line is now disconnected from the traction drive via its first connection, the interlock loop is interrupted, which can be detected by appropriate evaluation electronics. In response to this, an energy source (e.g. a battery) can be disconnected from the on-board power supply system, so that no dangerous voltage is applied at the open first connection.

However, since in certain situations operation of the work machine is desired even with the crawler carrier dismantled, for example during self-assembly or self-disassembly of the crawler carrier, the mating plug connector module according to the disclosure provides an option for safely stowing or "parking" the open end of the supply line. For this purpose, the open first connection is connected to the corresponding mating connection of the mating plug connector module. This means that there is no longer any risk from the first connection, as it is no longer open but safely connected to the mating connection. Once the connection has been established, the mating plug connector module bridges the interlock loop and thus enables safe operation of the work machine in the partially scaffolded state. For this purpose, the mating plug connector module has, in particular, a corresponding interlock line that bridges or closes the interlock loop. The interlock line of the mating plug connector module (i.e. the interlock loop including the mating plug connector module) is therefore only used if the supply line(s) of the electric traction drive is/are disconnected.

Since the mating plug connector module is located on the undercarriage, preferably on the middle part in a position that is easily accessible to the operating personnel, the supply line can be stowed quickly and easily after disconnection from the traction drive. No separate parts have to be provided here, which could get lost and make operation more difficult.

In one possible embodiment, it is provided that at least one supply line is configured as an energy supply line for supplying energy to the traction drive. The energy supply line supplies the traction drive with power from the internal HV on-board power supply system of the work machine. Preferably, three energy supply lines are provided, which are configured in particular as AC phase cables. The at least one energy supply line is preferably connected to at least one inverter. Said inverter is ideally arranged in or on the middle part of the undercarriage.

In another possible embodiment, it is provided that at least one supply line is configured as a signal line for transmitting control signals to the traction drive and/or for transmitting sensor signals. Said controller may be an inverter or a separate control unit. Such a control line serves in particular to control the traction drive. Several control and/or signal lines may be provided to transmit different signals. One or more of the signal lines can be a resolver cable.

In a further possible embodiment, it is provided that the traction drive is connected to at least one first supply line via a first connection and to at least one second supply line via a second connection in a disconnectable manner. Preferably, the first connection serves to supply energy to the traction drive (i.e. it is connected to one or more energy supply lines) and the second connection is used to transmit signals, for example control signals for controlling the traction drive or sensor signals. Thus, different supply lines are connected in parallel to the traction drive via corresponding connections in a disconnectable manner. Of course, more than two connections and a corresponding number of mating connections can be provided for each traction drive.

In another possible embodiment, it is provided that the mating plug connector module includes a first mating connection for connecting to the first connection and a second mating connection for connecting to the second connection. This allows each connection of a supply line that is open after disconnection from the traction drive to be detachably connected to a corresponding mating connection of the mating plug connector module in order to stow it safely and to bridge the interlock loop via the mating plug connector module in a current-conducting manner.

Preferably, the first and second connections are formed on separate connectors and/or differently. For example, several energy supply lines may be connected to a common first connection. This can have a different shape than a second connection, which is connected to one or more signal lines. A wide variety of designs are conceivable here, wherein a corresponding mating connection is provided on the mating plug connector module for each connection of a supply line, in particular in the form of a simple plug-in connection, irrespective of the exact design.

Optionally, at least one locking device can be provided for fixing the connections or supply lines connected to the mating plug connector module so that the connections cannot detach unintentionally.

In another possible embodiment, it is provided that a common interlock loop is connected to the first and second mating connections and can be bridged in a current-conducting manner by simultaneously connecting the first and second connections to the first and second mating connections. In this embodiment, the interlock loop can be closed only by connecting both connections to their respective mating connections. If one of the connections is not connected to its mating connection, the common interlock loop is broken. This can ensure that any operation of the work machine in a partially scaffolded state can only take place if all supply lines are securely stowed in the mating plug connector module, i.e. that both crawler carriers are removed or attached, for example.

In an alternative embodiment, several separate interlock loops can be provided, wherein a first interlock loop is connected to the first mating connection and a separate, second interlock loop is connected to the second mating connection. In this case, each interlock loop can be bridged separately by connecting the respective connection to the associated mating connection in a current-conducting manner. In this embodiment, each supply line is assigned its own interlock loop, so that different connection or fault states can be determined by evaluating the interlock loops accordingly.

In a further possible embodiment, it is provided that the first connection and the first mating connection have interlock contacts which in the connected state are connected to one another in a current-conducting manner. If a second connection and a second mating connection are provided, as described above, these preferably also have corresponding interlock contacts.

In another possible embodiment, an evaluation unit is provided which is connected to the interlock loop and is configured to detect an interruption of the interlock loop. If several interlock loops are provided, they can be analyzed by a common evaluation unit or, alternatively, each by its own evaluation unit. The evaluation unit is preferably also configured to disconnect an energy source (for example a battery) from an on-board power supply system of the work machine when an interruption of the associated interlock loop is sensed, so that there is no longer any voltage at the open connections. When the interlock loop is subsequently closed or bridged, the evaluation unit can also detect this and, in particular, reconnect the energy source to the on-board power supply system so that the work machine can be operated. The disconnection or connection of the energy source can be initiated directly or indirectly by the evaluation unit, in the latter case for example by communication with a corresponding control unit which controls the disconnection or connection of the energy source.

In another possible embodiment, it is provided that the first connection is accessible from outside the middle part and the crawler carrier and, in particular in the connected state, is arranged outside the middle part and crawler carrier. In this way, the supply lines can be easily and quickly disconnected from the respective connection points on the crawler carrier and/or the middle part, for example during disassembly of the crawler carrier. A connection can be made just as smoothly and quickly.

In another possible embodiment, it is provided that a portion of the at least one supply line adjacent to the first connection runs outside the middle part and crawler carrier, i.e. in particular outside the steel structure of the undercarriage, and in particular is configured to be movable or flexible. The at least one supply line is preferably configured in such a way that the first connection can selectively be connected to the first mating connection of the mating plug connector module or to a connection arranged on the crawler carrier and connected to the traction drive. This allows the supply line to be connected to the mating connection quickly and easily after disconnection from the traction drive.

In another further possible embodiment, at least two crawler carriers connected to the middle part are provided, which are arranged in particular on opposite sides of the middle part. The crawler carriers each comprise at least one traction drive, which is supplied via at least one supply line.

In another possible embodiment, it is provided that the mating plug connector module comprises two first mating connections for connecting to the first connections of the respective supply lines. Thus, a common mating plug connector module is provided for the various traction drives. The mating plug connector module can comprise a plurality of separate interlock loops for the respective traction drives, or a plurality of interlock loop lines that can separately bridge the separate interlock loops assigned to the respective traction drives. This allows the work machine to be operated, for example, in a state in which one crawler carrier is mounted and its traction drive is connected, while the other crawler carrier is dismounted and the corresponding connections are still connected to the mating plug connector module. Alternatively, a common interlock loop can be provided so that all connections of the supply lines of all traction drives must be connected to the mating plug connector module at the same time in order to close the interlock loop.

In an alternative embodiment, at least two separate mating plug connector modules are provided on the undercarriage, each with a first mating connection for connecting to the first connection of the respective supply line. Thus, a separate mating plug connector module is provided for each traction drive. Preferably, the work machine has a corresponding number of interlock loops, each of which is assigned a mating plug connector module.

In a further possible embodiment, it is provided that the at least one crawler carrier is detachably connected to the middle part, wherein the work machine preferably comprises a superstructure rotatably mounted on the undercarriage and is configured to perform lifting operations in a self-assembly mode without mounted crawler carriers with a boom or boom section mounted on the superstructure, for example in order to lift the crawler carriers from a low-loader to connection points on the middle part. In self-assembly mode, an energy supply to the work function is preferably only activated when the interlock loop is closed via the mating plug connector module. If, on the other hand, the interlock loop is interrupted, the work function (e.g. operating a boom, a hoisting winch, etc.) cannot be used or the energy supply is deactivated.

BRIEF DESCRIPTION OF THE FIGURES

Further features, details and advantages of the disclosure will be apparent from the exemplary embodiments explained below with reference to the Figures. Shown are in.

DETAILED DESCRIPTION

Figure 1:
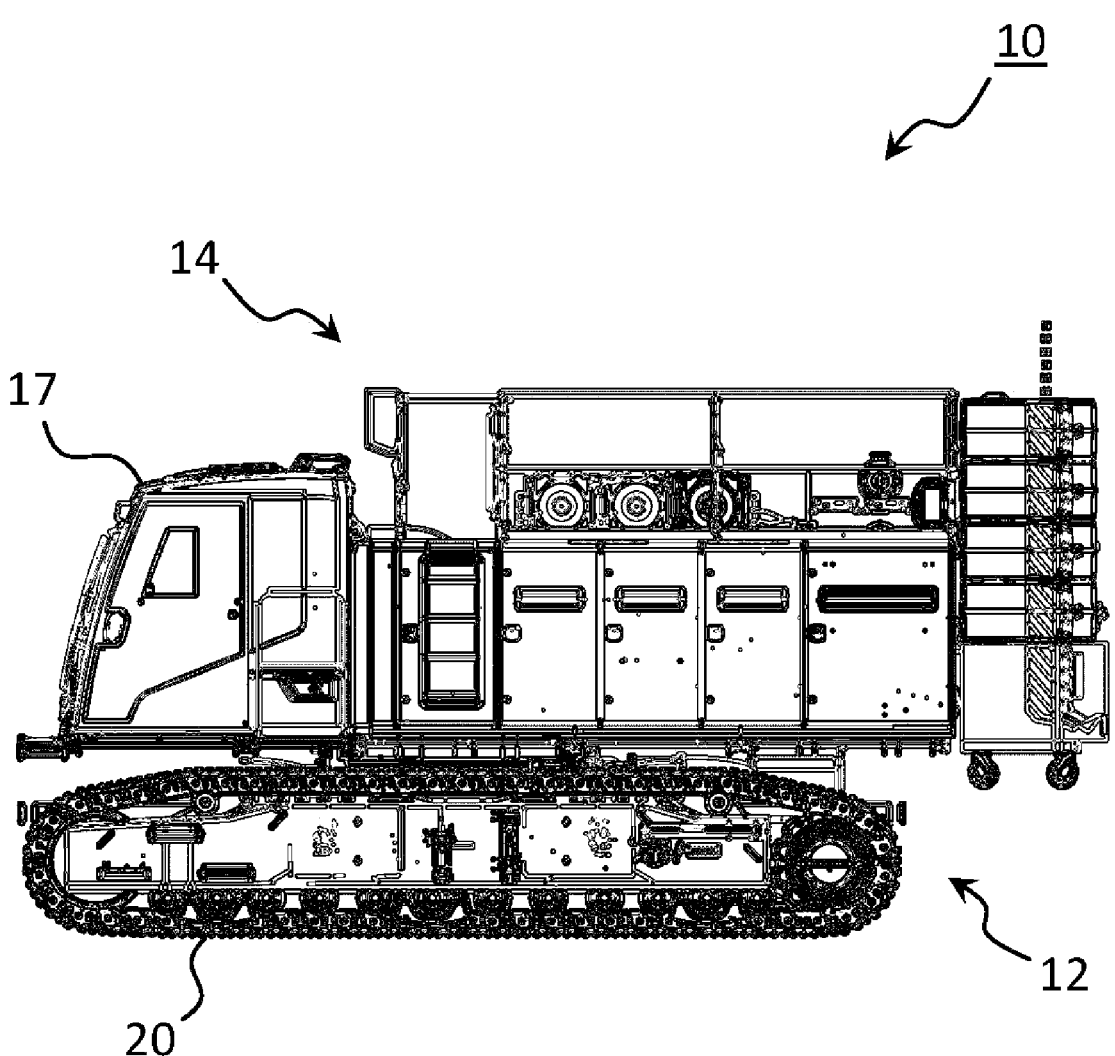
FIG. 1: A side view of the undercarriage and superstructure of the work machine according to the disclosure, according to a preferred exemplary embodiment.
Figure 3:
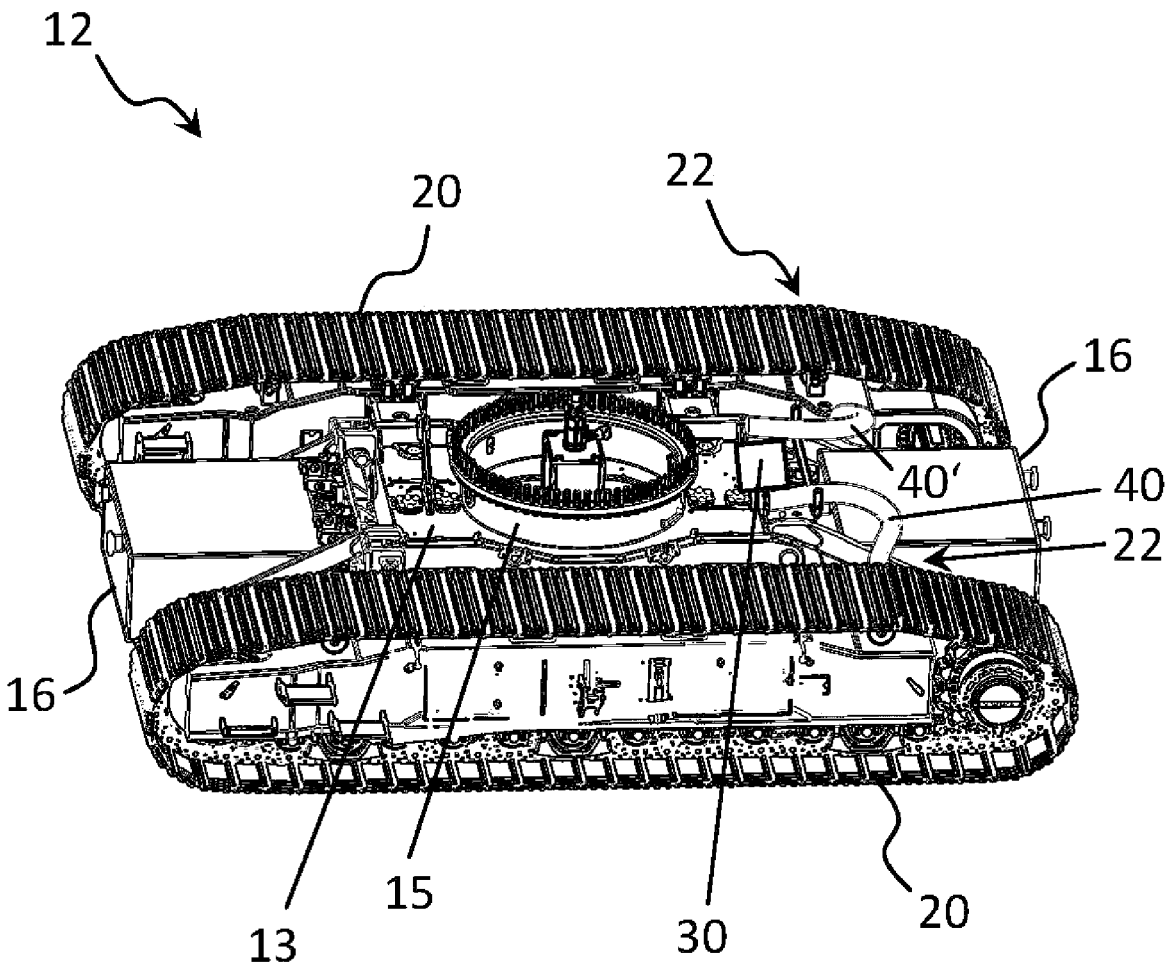
FIG. 3: a perspective view of the undercarriage of the work machine according to FIG. 1.

FIG. 1 shows a preferred exemplary embodiment of the work machine 10 according to the disclosure in a side view. The exemplary embodiment shown is a duty-cycle crawler crane 10 with a mobile undercarriage 12 and a superstructure 14 rotatably mounted on the undercarriage 12 about a vertical axis of rotation. FIG. 3 shows the undercarriage 12 in a perspective view. The boom of the duty-cycle crawler crane 10 is not shown here. The superstructure 14 has a driver's cab 17 and is rotatably connected to a middle part 13 of the undercarriage 12 via a slewing ring 15, which can be seen in FIG. 3.

Two crawler chassis 20 are attached to the side of the middle part 13, so that the middle part 13 is placed centrally between the crawler carriers 20 of the crawler chassis. The crawler carriers 20 have electric traction drives 22 which drive the crawler chains and whose position is merely indicated by arrows in FIG. 3. The traction drives 22 are, in particular, electric motors.

As can be further seen in FIG. 3, the duty-cycle crawler crane 10 may have a central ballast 16 mounted on the middle part 13 at the front and rear between each of the crawler carriers 20. Said ballast can be selectively attached or detached, depending on the application.

Figure 2:
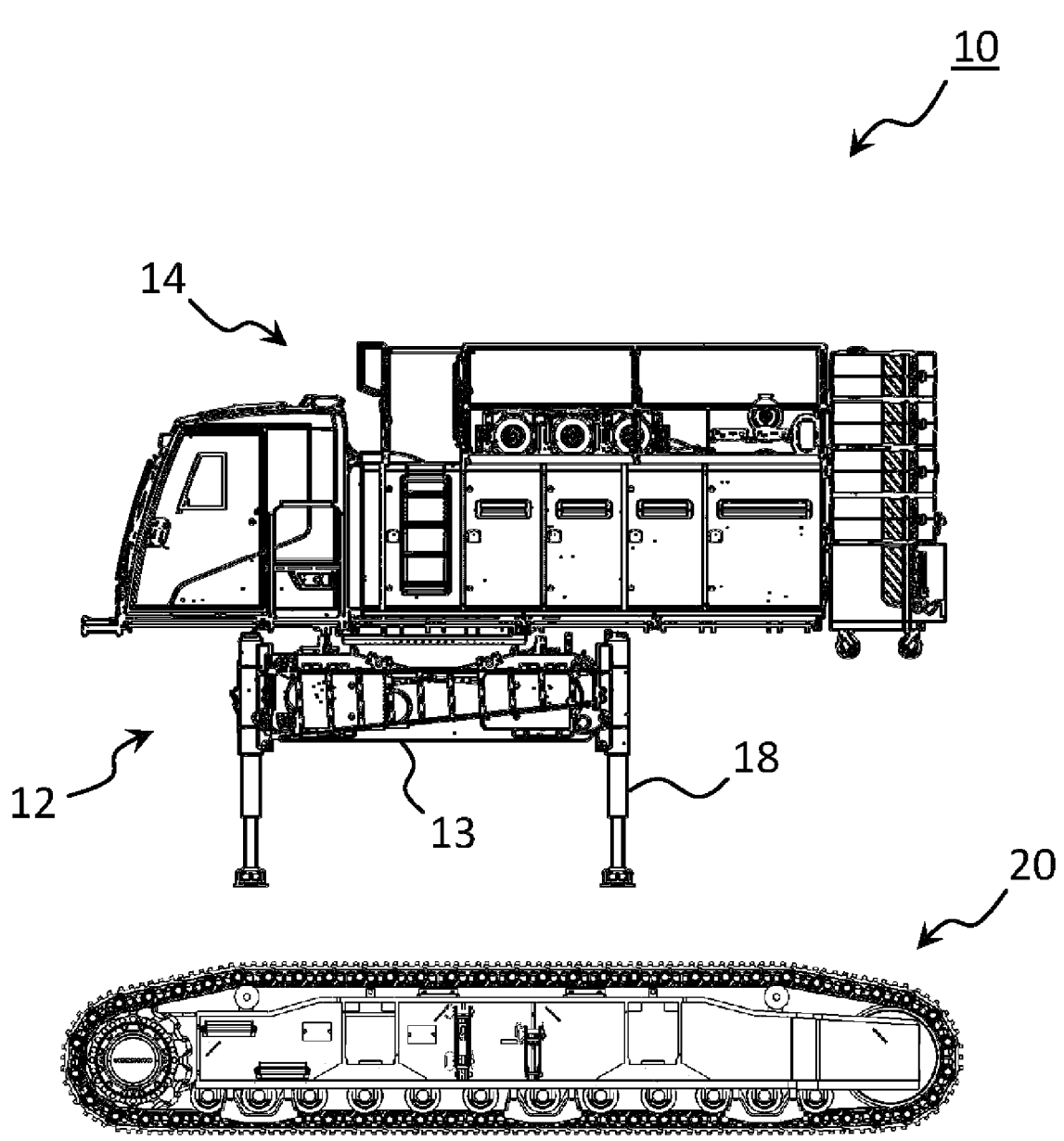
FIG. 2: A side view of the work machine according to FIG. 1 in self-assembly mode with disassembled crawler carriers.

FIG. 2 shows a side view of the superstructure 14 mounted on the middle part 13, with the crawler carriers 20 disassembled from the middle part 13. The work machine is in a self-assembly state with a plurality (here: four) of hydraulic jack-up cylinders 18, which are vertically aligned and located on the middle part 13, extended. The partially scaffolded duty-cycle crawler crane 10 stands on the jack-up cylinders 18, which act as support legs and hold the middle part 13 in an elevated position in which the crawler carriers 20 can be attached to the side of the middle part 13. By means of a boom (or, in particular, a linkage piece of the boom) not shown here, the partially scaffolded duty-cycle crawler crane 10 can independently lift and move the crawler carriers 20 in a self-assembly mode.

The electric traction drives 22 are supplied and controlled from the middle part 13 by an HV on-board power supply system of the work machine 10. This can be a DC on-board power supply system. The on-board power supply system preferably extends from the middle part 13 via slip ring contacts into the superstructure 14, where certain electric drive components or loads are also supplied. Preferably, therefore, electrical drive components and loads in the superstructure 14 and in the undercarriage 12, including the electric traction drives 22, are supplied by the same on-board power supply system.

For the electric supply of the traction drives 22, three energy supply lines in the form of AC phase cables may be provided for each traction drive 22, which supply the respective traction drive 22 with power from the HV on-board power supply system. The energy supply lines 40 run between the traction drives 22 and one or more inverters (not shown), which are preferably arranged in the middle part 13. The inverters assume the communication with the traction drives 22 and modulation of current and voltage to supply power to the traction drives 22.

Moreover, control of the traction drives 22 may be effected via one or more control lines. Communication with the traction drives 22 can also be performed via the inverters or a separate control module. In addition, one or more signal lines may be provided, for example to transmit sensor signals from the traction drives 22 to a controller (or the inverters) in the middle part 13.

The electrical lines for supplying and controlling the traction drives 22 and, if necessary, for signal transmission are collectively referred to as supply lines 40. Preferably, the supply lines 40 are not routed in the steel structure of the undercarriage 12 to the traction drives 22, but run outside the middle part 13 and crawler carriers 20, as indicated in FIG. 3. The supply lines 40 are preferably configured to be movable or flexible.

The supply lines 40 are connected to the traction drives 22 in a disconnectable manner via connections 41, 42. For this purpose, in particular, corresponding connectors in the form of sockets and plugs are provided, which are detachably connected to one another to form current-conducting connections. The connections 41, 42 are arranged in particular outside the crawler carriers 20 so that they are easily accessible from the outside and can be unplugged (and connected) without great effort.

Optionally, the traction drives 22 can be cooled. For this purpose, each traction drive 22 can be connected to a cooling circuit, with in particular two coolant lines running between the middle part 13 and the traction drives 22, which supply the coolant to the traction drives 22 and transport the heated coolant back to the middle part 13 again. The coolant lines preferably run parallel to the supply lines 40. The coolant lines are also preferably connected in a disconnectable manner to the traction drives via corresponding connections.

In self-assembly mode of the work machine 10, as shown for example in FIG. 2, the working functions of the partially scaffolded work machine 10 must be functional, i.e. the corresponding drives and loads must be supplied with current or voltage from the on-board power supply system. In this state, however, the crawler carriers 20 have been removed from the middle part 13, and the supply lines 40 have been disconnected from the corresponding connections on the crawler carrier 20 and are now open. Such open connections pose a potential risk to personnel if high voltage from the on-board power supply system is present there.

In order to eliminate this risk, the work machine 10 according to the disclosure is equipped with a high-voltage interlock loop (HVIL for short; hereinafter referred to as interlock loop 50). The interlock loop 50 serves to monitor the plug-in connections in the high-voltage circuit of the work machine 10 and is intended to prevent a hazard due to unintentional or improper disconnection of an HV plug-in connection (i.e., the connections 41, 42 of the supply lines 40). For this purpose, the interlock loop 50 is constructed as a closed electric loop extending from the on-board power supply system to the relevant electrical drives and loads through the respective plug-in connections or connections 41, 42. For this purpose, the connections 41, 42 in particular each comprise special-purpose interlock contacts which are connected to one another in a current-conducting manner when the connections 41, 42 are connected.

The connections 41 and 42 do not necessarily have to be separate connections. In the simplest case, the connections 41 and 42 can also only represent different pins, for example "HVIL-on" and "HVIL-off".

If all plug-in connections or connections 41, 42 are connected, the interlock loop 50 is closed. If the interlock loop 50 is interrupted, for example by disconnecting a connection 41, 42 of a supply line 40, this is detected by means of an evaluation unit (not shown) of the work machine 10 and an energy source (e.g. a battery) is then disconnected from the on-board power supply system. The system is thus de-energized and voltage is no longer applied at the open connection 41, 42. The evaluation unit may include a processor and memory with instructions stored therein for carry out the evaluations as described herein based sensor and/or signal inputs received by the evaluation unit. The evaluations made by the evaluation unit may include one or more outputs, such as indications on a display or send signals generated to one or more actuators, or generate messages sent to one or more external devices.

In the exemplary embodiment shown here, the energy supply lines of the right and left traction drives 22 may be connected via first connections 41, 41' and the signal lines of the right and left traction drives 22 may be connected via second connections 42, 42'. The three energy supply lines can have a common connector. In principle, individual connectors are also conceivable.

During self-assembly mode of the work machine 10, the crawler carriers 20 are removed and the first and second connections 41, 42 of the supply lines 40 are exposed. As a result, the interlock loop 50 is interrupted, which would mean that no energy supply would be available for self-assembly mode.

According to the disclosure, a mating plug connector module 30 is provided for this purpose, which in this exemplary embodiment is arranged on the middle part 13 in the area of the middle part-side connection points of the supply lines 40, cf. FIG. 3. The mating plug connector module 30 has interfaces matching the connections 41, 42 of the supply lines 40, in this exemplary embodiment in the form of a first mating connection 31 for connecting to the first connection 41 and a second mating connection 32 for connecting to the second connection 42 of the supply lines 40. The open ends of the supply lines 40 are simply connected to the mating connections 31, 32 of the mating plug connector module 30 and "parked" there for partially assembled operation.

The mating plug connector module 30 is configured in such a way that the interlock contacts of the connections 41, 42 are bridged in a current-conducting manner and the interlock loop 50 is closed as a result. As a result, the energy supply of the on-board power supply system can be used in the partially assembled state of the work machine 10, for example for self-assembly or disassembly of the crawler carrier 20.

Figure 4:
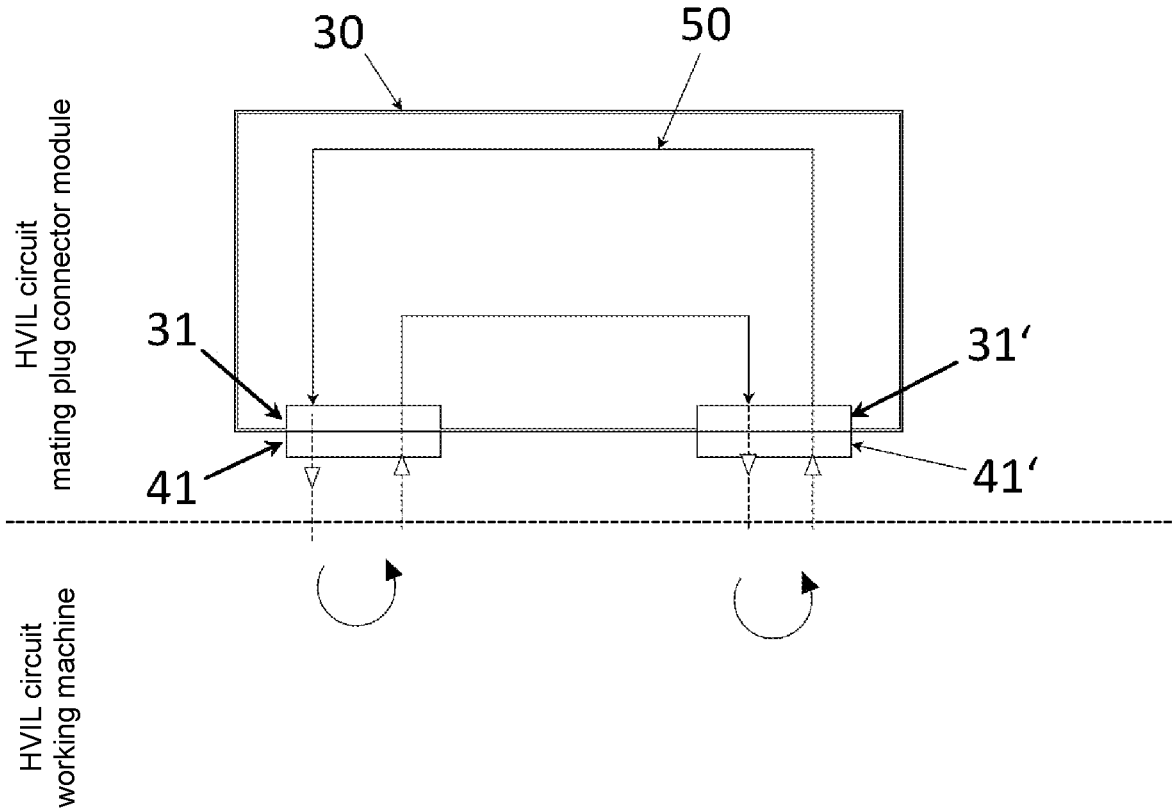
FIGS. 4-6: schematic diagrams of the internal structure of the mating plug connector module based on three exemplary embodiments.
Figure 5:
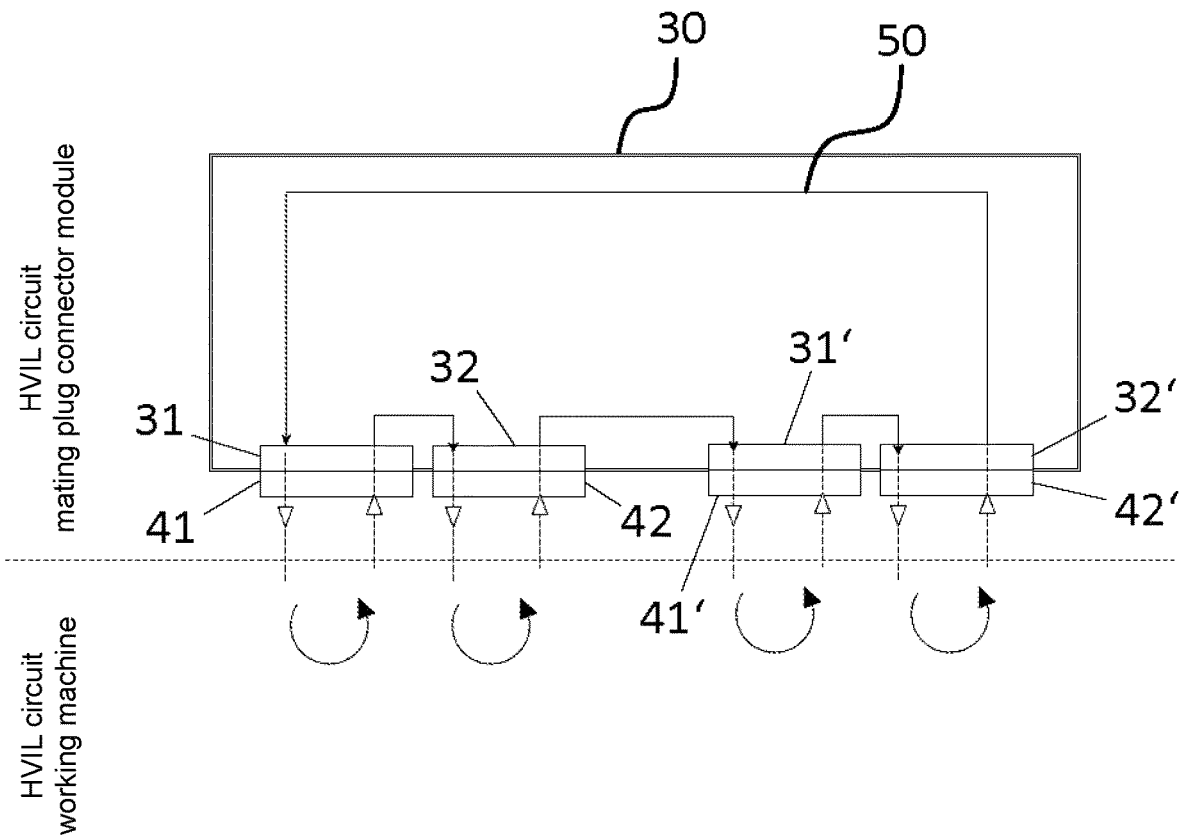
Figure 6:
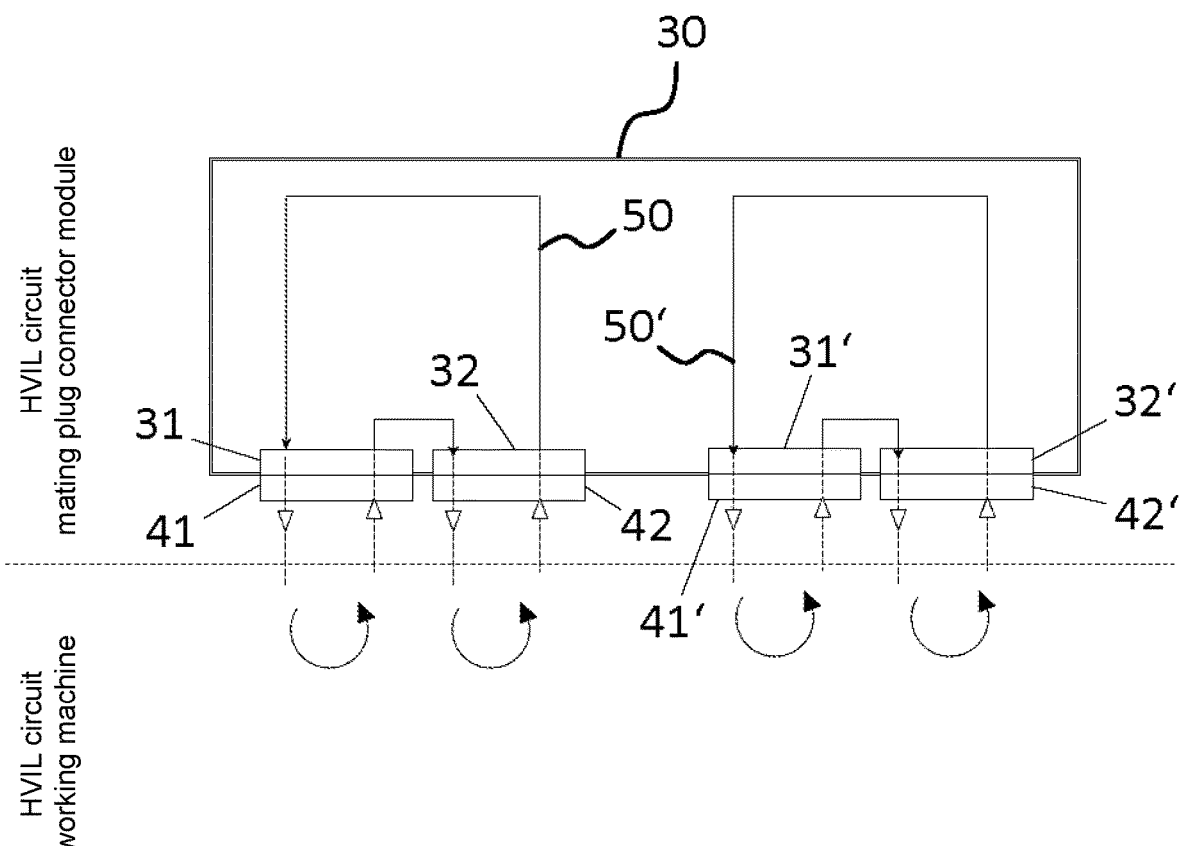

FIGS. 4-6 show three different exemplary embodiments of the basic structure of the mating plug connector module 30. In the first exemplary embodiment shown in FIG. 4, the mating plug connector module 30 comprises a single interlock loop 50 (more specifically, interlock lines to a single interlock loop 50 of the work machine 10) and two first mating connections 31, 31' for the first connections 41, 41' of the right and left crawler carriers 20. The curved arrows indicate that the interlock lines of the interlock loop 50 run through the connections 41, 41' and mating connections 31, 31' into and out of the mating plug connector module 30 and also outside as a closed circuit.

If further supply lines 40 are provided for signal transmissions (e.g. control lines), these may optionally be connectable to a separate mating plug connector module comprising interlock lines for the same or a separate interlock loop 50, 50'. Alternatively, a common mating plug connector module 30 may comprise both first mating connections 31, 31' for the first connections 41, 41' and second mating connections 32, 32' for the second connections 42, 42' of the supply lines 40. This option is shown in FIGS. 5 and 6, wherein in the second exemplary embodiment according to FIG. 5, a single common interlock loop 50 is provided which runs through all connections 41, 41', 42, 42' and mating connections 31, 31', 32, 32'. In this case, the interlock loop 50 is closed and the work machine 10 is thus ready for operation only if all supply lines 40 of the traction drives 22 are actually plugged in via their first and second connections 41, 41', 42, 42' at the mating plug connector module 30.

Alternatively, separate interlock loops 50, 50' can be provided for the respective traction drives 22 (i.e. in particular for the right and the left traction drive 22), which is shown in FIG. 6 by means of a third exemplary embodiment. In this way, the work machine 10 is already ready for operation when one of the crawler carriers 20 is mounted on the middle part 13 and the corresponding supply lines 40 are connected, while the other crawler carrier 20 is dismounted and the associated supply lines 40' are connected to the mating plug connector module 30. Here again, instead of a single mating plug connector module 30, several separate mating plug connector modules could be provided for the respective interlock loops 50, 50' or for the respective connection types 41, 42.

The first and second connections 41, 42 or the corresponding connectors are preferably of different design, but may also be of identical design. The first connection 41, 41' can comprise one or more plug interfaces (or sockets) for one or more energy supply lines, in particular for three AC phase cables. The second connection 42, 42' can comprise one or more plug interfaces (or sockets) for one or more signal lines.

Owing to a movable design of the supply lines 40, they can simply be unplugged from the crawler carrier 20 for disassembly and plugged into the mating plug connector module 30. The energy supply of the on-board power supply system is deactivated during the plug-in process, so that a simple, fast and safe assembly and disassembly process is possible.

In summary, the solution according to the disclosure with interlock loop 50 and mating plug connector module 30 results in the following advantages:

with the interlock loop-monitored mating plug connector module 30 for electrical supply and signal lines (in short: supply lines 40), the work machine 10 can also be put into operation in a partial configuration.

The live line ends or connections 41, 42 of the supply lines 40 are parked so that they are safe from contact and protected against incorrect operation.

In the event of incorrect operation, the on-board power supply system is immediately disconnected from its energy source.

a self-assembly mode of the crawler carriers 20 can be realized only by closing the interlock loop 50, 50' of the work machine 10.

LIST OF REFERENCE CHARACTERS

10 Work machine
12 Undercarriage
13 Middle part
14 Superstructure
15 Slewing ring
16 Central ballast
17 Driver's cab
18 Jack-up cylinder
20 Crawler carrier
22 Traction drive
30 Mating plug connector module
31 First mating connection (left crawler carrier)
31' First mating connection (right crawler carrier)
32 Second mating connection (left crawler carrier)
32' Second mating connection (right crawler carrier)
40 Supply line (left crawler carrier)
40' Supply line (right crawler carrier)
41 First connection (left crawler carrier)
41' First connection (right crawler carrier)

42 Second connection (left crawler carrier)
42' Second connection (right crawler carrier)
50 Interlock loop
50' Interlock loop

The invention claimed is:

1. Work machine, comprising an undercarriage which comprises a middle part and at least one crawler carrier which is connected to the middle part and comprises at least one electric traction drive, wherein at least one supply line runs from the middle part to the traction drive and is connected to the latter in a disconnectable manner via a first connection, wherein an electrical interlock loop is connected to the traction drive via the first connection, and a mating plug connector module is arranged on the undercarriage and has a first mating connection for connecting to the first connection of the supply line, and is configured to bridge the interlock loop, which is interrupted by a disconnection from the traction drive, by connecting the first connection to the first mating connection in a current-conducting manner.

2. Work machine according to claim 1, wherein at least one supply line is configured as an energy supply line for supplying energy to the traction drive, wherein three energy supply lines are provided, which are configured in particular as AC phase cables.

3. Work machine according to claim 1, wherein at least one supply line is configured as a signal line for transmitting control signals to the traction drive and/or for transmitting sensor signals to a controller.

4. Work machine according to claim 1, wherein the traction drive is connected to at least one first supply line via a first connection and to at least one second supply line via a second connection in a disconnectable manner, wherein the first connection serves to supply energy to the traction drive and the second connection serves to transmit signals for the traction drive.

5. Work machine according to claim 4, wherein the mating plug connector module comprises a first mating connection for connecting to the first connection and a second mating connection for connecting to the second connection, wherein the first and second connections are configured as separate connectors and/or differently.

6. Work machine according to claim 5, wherein a common interlock loop is connected to the first and second mating connections and can be bridged in a current conducting-manner by simultaneously connecting the first and second connections to the first and second mating connections.

7. Work machine according to claim 5, wherein a first interlock loop is connected to the first mating connection and a second interlock loop, which is separate therefrom, is connected to the second mating connection, and each interlock loop can be bridged separately in a current-conducting manner by connecting the respective connection to the associated mating connection.

8. Work machine according to claim 1, wherein the first connection and the first mating connection comprise interlock contacts which in the connected state are connected to one another in a current-conducting manner.

9. Work machine according claim 1, further comprising an evaluation unit, which is connected to the interlock loop and is configured to detect an interruption of the interlock loop, wherein the evaluation unit is further configured to disconnect an energy source from an on-board power supply system of the work machine when an interruption of the interlock loop is sensed.

10. Work machine according to claim 1, wherein the first connection is accessible from outside the middle part and the crawler carrier and, in the connected state, is arranged outside the middle part and the crawler carrier.

11. Work machine according to claim 1, wherein a portion of the at least one supply line adjoining the first connection runs outside the middle part and crawler carrier and, is configured to be movable, wherein the supply line is configured in such a way that the first connection can be connected selectively to the first mating connection of the mating plug connector module or to a connection arranged on the crawler carrier and connected to the traction drive.

12. Work machine according to claim 1, comprising at least two crawler carriers connected to the middle part, each comprising at least one traction drive with in each case at least one supply line.

13. Work machine according to claim 12, wherein the mating plug connector module comprises two first mating connections for connecting to the first connections of the respective supply lines.

14. Work machine according to claim 12, wherein at least two mating plug connector modules, each having a first mating connection for connecting to the first connection of the respective supply line, are arranged on the undercarriage.

15. Work machine according claim 1, wherein the at least one crawler carrier is detachably connected to the middle part, wherein the work machine comprises a superstructure rotatably mounted on the undercarriage and is configured to perform lifting operations in a self-assembly mode without mounted crawler carriers with a boom or boom section mounted on the superstructure, wherein in the self-assembly mode an energy supply of the working function is activated only with the interlock loop closed via the mating plug connector module.

16. Work machine according to claim 1, wherein the traction drive is a traction drive of the at least one crawler carrier, and wherein the at least one supply line runs from the middle part to the traction drive of the at least one crawler carrier.

17. Work machine according to claim 1, wherein the disconnection from the traction drive is a disconnection of the supply line from the traction drive of the at least one crawler carrier.

* * * * *